United States Patent [19]

Simmons

[11] Patent Number: 5,659,986
[45] Date of Patent: Aug. 26, 1997

[54] INTERLOCKING SECURITY CASE FOR LICENSE PLATES

[76] Inventor: Otis I. Simmons, 4914 Merriam Dr., Overland Park, Kans. 66203

[21] Appl. No.: 529,728

[22] Filed: Sep. 18, 1995

[51] Int. Cl.⁶ .................................................. G09F 7/00
[52] U.S. Cl. .................. 40/202; 40/209; 40/655
[58] Field of Search ........................... 40/201, 202, 209, 40/643, 649, 655

[56] References Cited

U.S. PATENT DOCUMENTS

| | | |
|---|---|---|
| D. 308,849 | 6/1990 | Short . |
| 1,573,113 | 2/1926 | Irie .............................. 40/201 |
| 1,583,626 | 5/1926 | Swarts ........................ 40/643 |
| 1,667,829 | 5/1928 | Strump ....................... 40/655 |
| 1,795,321 | 3/1931 | Sunkenberg ............... 40/201 |
| 1,923,310 | 8/1933 | Hippold ...................... 40/201 |
| 2,027,086 | 1/1936 | Brookey ..................... 40/655 |
| 2,156,806 | 5/1939 | Ducey ..................... 40/202 X |
| 2,710,475 | 6/1955 | Salzmann ............... 40/209 X |
| 3,340,639 | 9/1967 | Savage . |
| 3,340,640 | 9/1967 | Savage . |
| 3,374,568 | 3/1968 | Trammell, Jr. . |
| 3,432,954 | 3/1969 | Ford ........................... 40/202 |
| 3,685,188 | 8/1972 | Krokos et al. . |
| 3,877,264 | 4/1975 | Foglietti . |
| 4,182,062 | 1/1980 | Varga . |
| 4,891,895 | 1/1990 | DeLaquill, Jr. . |
| 4,903,422 | 2/1990 | Syversen . |
| 5,012,602 | 5/1991 | Storey ........................ 40/201 |

*Primary Examiner*—Brian K. Green
*Attorney, Agent, or Firm*—Hovey, Williams, Timmons & Collins

[57] ABSTRACT

A security device for deterring theft of a license plate attached to a vehicle includes a somewhat box like enclosure base (1) with sides folded over toward the center of an open face to provide a retaining border for holding the transparent, shatterproof cover (2) in place and limiting the opportunity of a breach of the device. The cover is wedged into a bottom face plate (3) such that the cover and plate are rigidly attached to one another without the need for rivets, adhesives, etc. A key lock (4) releasably secures the bottom face plate, and thereby the cover, to the enclosure base.

15 Claims, 1 Drawing Sheet

INTERLOCKING SECURITY CASE FOR LICENSE PLATES

BACKGROUND—FIELD OF INVENTION

This invention relates to security devices, specifically, devices used to protect vehicle license plates and stickers from theft.

BACKGROUND—DESCRIPTION OF PRIOR ART

Every motorized vehicle in the United States operating on public roadways carries license plates and, in many instances, annual registration stickers.

In recent years theft of license plates and/or stickers has created a need for a stylish, easy to use, and effective device to deter theft of license plates and stickers.

Inventors have created several devices to deter theft but none have achieved commercial success.

The devices thus far created are too difficult for the general motoring public to use and/or are ineffective.

a) #4903422 (License Plate Frame Assembly) requires an adhesive to seal the back and transparent front panel together.

b) #3685188 (License Plate Security Locking Device) leaves the license plate and sticker exposed so that sticker can be cut out of plate and removed.

c) #3877264 (Anti-theft License Plate Fastener) is designed to protect the fuel tank filler opening rather than the theft of the tag and sticker.

d) #3340639 and #3340640 (Vehicle License Plate Holder and Locking Means) requires complicated assembly and leaves the tag and stickers exposed for cutting out.

e) #308849 (License Plate Sticker Lock) provides a transparent cover over the sticker but provides no protection for the entire license plate.

SUMMARY OF THE INVENTION

The objects and advantages of this invention are:

(a) to provide a security device to fully enclose the license plate, stickers and mounting screws;

(b) to provide a security device which attaches to the vehicles in the same way as simply attaching the license plates;

(c) to provide a shatter proof transparent cover secured over the license plate and sticker by a key lock;

(d) to provide a security device which requires no assembly by the user;

(e) to provide a security device that does not require welding, riveting or adhesives to manufacture;

(f) to provide a security device which is attractive to users and which will be selected over purely decorative frame work to border the license plate;

(g) to provide a security device using modern colors and environmentally safe, chip resistant coatings.

In accordance with these and other objects evident from the following description of a preferred embodiment of the invention, the security device includes a base assembly for attachment to the vehicle and a cover assembly adapted to be removably coupled with the base assembly for substantially encasing the license plate therebetween. The base assembly includes a generally flat backing portion configured to fit between the vehicle and license plate when the base assembly and license plate are attached to the vehicle. A retaining portion projects generally perpendicularly from the backing portion to define an inner open space configured for receiving the license plate. The retaining portion includes an inturned section spaced from the backing portion. The cover assembly, on the other hand, includes a transparent panel configured for placement between the backing portion and inturned section in covering relationship with the open face when the cover assembly is coupled with the base assembly. A locating flange projecting perpendicularly from the panel is located within the open space and in juxtaposition with the retaining portion when the panel is in its covering relationship. The security device also includes a locking mechanism for releasably securing the flange to the retaining portion to interlock the base and cover assemblies when the panel is in the covering relationship.

BRIEF DESCRIPTION OF THE DRAWING FIGURES

The drawings show the following:

(a) FIG. 1 is an isometric view of the Interlocking Security Case for License Plates. It shows how the top edge of the transparent cover slips under the wrap-over portion of the top edge and sides of the enclosure base and how the flange on the bottom face plate slips inside the bottom edge of the enclosure base to form an interlocking unit.

(b) FIG. 2 is a side view of the bottom face plate which is shaped to hold the transparent cover in place without adhesives rivets or other fastening items. It provides a base for the key lock and a flange that falls inside the lower edge of the metal box completing the interlocking feature.

REFERENCE NUMERALS IN DRAWINGS

1. Enclosure base
2. Transparent cover
3. Bottom face plate
4. Key lock

Detailed Description

Figure 1:
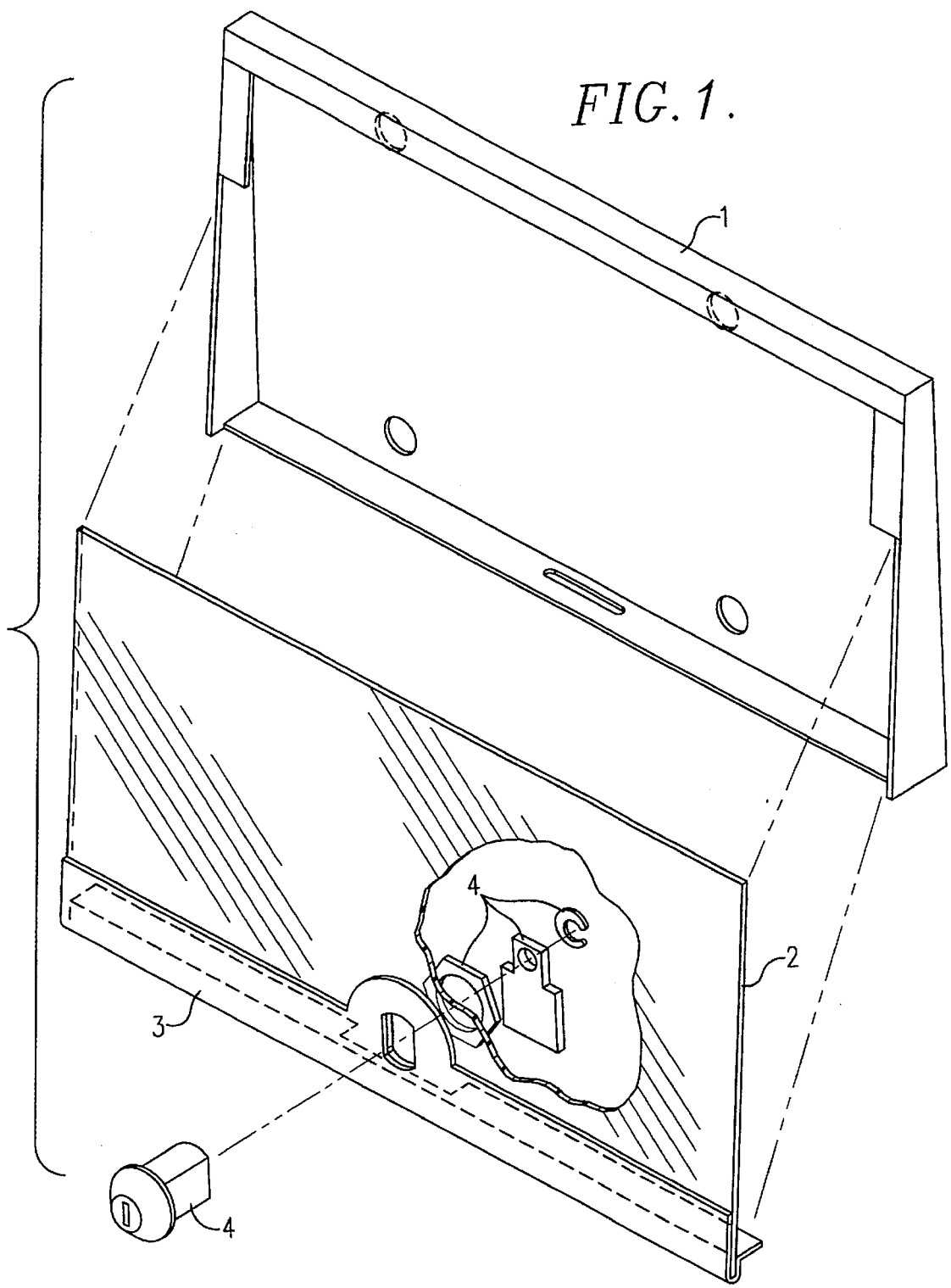

A embodiment of the security device of the present invention is illustrated in FIG. 1.

The enclosure base (1) formed from 20 gauge cold rolled steel. The base could be made from other types and gauge metals or molded in various plastic materials. The inside dimensions are 6-¼" by 11-¼", just adequate to insert a state license plate.

The view of the enclosure base shows the wrap-over portion of the top edge and the two sides. It shows the holes in the enclosure base that corresponds to the holes in license plates through which screws will attach the license plate and enclosure base to the vehicle. The oval slot in the bottom edge of the enclosure base is for the lock plunger to protrude through.

The sides of the enclosure base are tapered out at the bottom to provide space for the lock mechanism and to cover the edges of the bottom face plate.

The transparent cover (2) is 0.093" thick Lexan, a shatterproof transparent material, made by the General Electric Co. Other types and gauges of transparent material could be used.

The bottom face plate (3) is made from the same material as the enclosure base. The "U" shaped groove will receive the edge of the transparent cover under pressure.

The lock (4) is a key lock made by National Cabinet Lock, model #C-8701.

Figure 2:
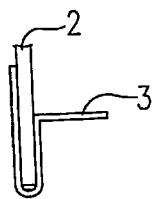

Operation—FIGS. 1 and 2

The security device is opened by lifting up and pulling out and down on the bottom face plate (3).

The license plate is then inserted into the enclosure base (1) and screws inserted through the holes in the license plate and the enclosure base and screwed into the holes on the vehicle.

The top of the transparent cover (2) is inserted under the wrap-over portion of the sides and top of the enclosure base and the bottom face plate (3) is pushed up and in until the flange on the bottom face plate is inside the lower edge of the enclosure base.

The key is turned in the lock (4) to move the lock plunger downward through the slot in the bottom edge of the enclosure base, to a locked position after which the key is removed.

Accordingly the reader will see that the interlocking security case attaches easily to a motor vehicle providing an effective deterrent to the theft of the vehicle's license plate and annual registration sticker.

It adds a decorative touch to the vehicle and can be produced in a wide variety of finishes using environmentally safe coating materials Although the description above contains many specifications, these should not be construed as limiting the scope of the invention, but as merely providing illustrations of some of the presently preferred embodiments of this invention. For example:

(a) The structural parts of the case shown in FIG. 1 and 2 could be made from different weight metals or it could be molded from plastic materials.

(b) The portion of the top edge and sides folded inward toward the center of the case serving as a retainer for the top half of the transparent cover could be welded or riveted where they meet to add security if the case is made from lighter weight metal.

(c) The strip of metal running from side to side at bottom of case through which the lock is inserted could be fastened to the transparent cover by adhesives, rivets, screws or bolts.

(d) The transparent cover could be made from less expensive materials and materials of different thickness.

(e) The key lock could be a wide variety of different locks.

(f) The lock could use a hooking device inside the case rather than have the plunger protrude through a slot in the bottom edge of the case.

(g) The transparent cover can be attached with an assortment of hinge devices attached at the top, bottom or either side.

Thus the scope of the invention should be determined by the appended claims and their legal equivalents rather than by the examples given.

I claim the following:

1. A device for deterring theft of a license plate attached to a vehicle, said device comprising:

a base assembly for attachment to the vehicle, said base assembly including
      a generally flat backing portion configured to fit between the vehicle and license plate when the base assembly and license plate are attached to the vehicle,
      said backing portion having four sides, and
      a retaining portion projecting generally perpendicularly from each of the four sides of the backing portion to define an inner open space configured for receiving the license plate,
      at least one of said retaining portions including an inturned section spaced from the backing portion;
   a cover assembly removably coupled with the base assembly for substantially encasing the license plate therebetween, said cover assembly including
      a transparent panel between the backing portion and inturned section of the retaining portion in covering relationship with the open space, and
      a locating flange projecting perpendicularly from the panel, said flange being located within the open space and in juxtaposition with the retaining portion; and
   locking mechanism releasably securing the flange to the retaining portion to interlock the base and cover assemblies.

2. A device as claimed in claim 1, said inturned section extending along opposite sides of the backing portion to present opposite side segments of the section, said side segments of the inturned section being relatively shorter than said opposite sides of the backing portion for presenting an accessway to the open space, through which the transparent panel is moved when placed in said covering relationship.

3. A device as claimed in claim 2, said inturned section extending along three of the sides of the backing portion, with said accessway being adjacent the other side of the backing portion.

4. A device as claimed in claim 3, said locating flange being in juxtaposition with the retaining portion extending along said other side.

5. A device as claimed in claim 4, said retaining portions extending continuously around the sides of the backing portion for surrounding the license plate received within the open space.

6. A device as claimed in claim 5, said locating flange and said transparent panel being formed of dissimilar materials, said flange including a generally U-shaped extension press-fit about the panel for rigidly interconnecting the flange and panel.

7. A device as claimed in claim 6, said locking mechanism being fixed to the flange of the cover assembly.

8. A device as claimed in claim 7, said retaining portion extending along said other side of the backing portion including an open slot, said locking mechanism including a plunger reversibly shiftable between a locked position, in which the plunger is received within the slot, and an unlocked position, in which the plunger is removed from the slot.

9. A device as claimed in claim 1, said backing and retaining portions of the base assembly being integrally formed.

10. A device as claimed in claim 9, said base assembly being formed of metal.

11. A device as claimed in claim 1, said locating flange and said transparent panel being formed of dissimilar materials, said flange including a generally U-shaped extension press-fit about the panel for rigidly interconnecting the flange and panel.

12. A device as claimed in claim 11, said locating flange being formed of metal.

13. A device as claimed in claim 12, said transparent panel being formed of a shatterproof plastic material.

14. A device as claimed in claim 1, said locking mechanism being fixed to the cover assembly.

15. A device as claimed in claim 14, one of said retaining portions including an open slot, said locking mechanism including a plunger reversibly shiftable between a locked position, in which the plunger is received within the slot, and an unlocked position, in which the plunger is removed from the slot.

* * * * *